United States Patent [19]
Nishijima

[11] Patent Number: 4,959,954
[45] Date of Patent: Oct. 2, 1990

[54] GAS TURBINE SYSTEM AND METHOD OF CONTROLLING THE SAME

[75] Inventor: Tsunemasa Nishijima, Hitachi, Japan
[73] Assignee: Hitachi, Ltd., Tokyo, Japan
[21] Appl. No.: 277,950
[22] Filed: Nov. 30, 1988

[30] Foreign Application Priority Data

Dec. 9, 1987 [JP] Japan .................. 62-309627

[51] Int. Cl.$^5$ ........................................... F02C 7/057
[52] U.S. Cl. ................................. 60/39.02; 60/39.07; 60/39.29
[58] Field of Search ............... 60/39.02, 39.07, 39.29, 60/237, 240

[56] References Cited

U.S. PATENT DOCUMENTS

| | | | |
|---|---|---|---|
| 2,618,431 | 11/1952 | Walker | 60/39.07 |
| 2,934,094 | 4/1960 | Szydlowski | 60/39.07 |
| 3,080,712 | 3/1963 | Wood | 60/39.29 |
| 3,659,417 | 5/1972 | Grieb | 60/39.07 |
| 3,747,355 | 7/1973 | Strub | 60/39.29 |
| 3,795,104 | 3/1974 | McLean | 60/39.29 |
| 4,149,371 | 4/1979 | Spraker et al. | 60/39.29 |
| 4,182,117 | 1/1980 | Exley et al. | 60/39.07 |
| 4,709,546 | 12/1987 | Weiler | 60/39.29 |
| 4,809,497 | 3/1989 | Schuh | 60/39.29 |

FOREIGN PATENT DOCUMENTS

| | | |
|---|---|---|
| 62293 | 6/1955 | France . |
| 531997 | 8/1939 | United Kingdom . |

*Primary Examiner*—Donald E. Stout
*Attorney, Agent, or Firm*—Antonelli, Terry, Stout & Kraus

[57] ABSTRACT

A gas turbine system having an extraction channel supplying part of the discharged air of a compressor to another installation, and a method of controlling the gas turbine system wherein an inlet guide vane or any other regulator for regulating the flow rate of inlet air is disposed at the inlet of the compressor of a gas turbine engine, and the flow rate of the inlet air of the compressor is controlled in correspondence with the fluctuation of the flow rate of extraction air to provide a gas turbine system and a controlling method therefore which do not adversely affect the efficiency of the gas turbine engine regardless of the fluctuations of the flow rate of the extraction air.

2 Claims, 3 Drawing Sheets

GAS TURBINE SYSTEM AND METHOD OF CONTROLLING THE SAME

BACKGROUND OF THE INVENTION

The present invention relates to a method and apparatus for controlling a gas turbine engine and more particularly, to a gas turbine system having an extraction channel for supplying part of the discharge air of a compressor to another installation and a method of controlling the same.

A gas turbine engine of the extracting operation type, in which part of the discharge air of a compressor is extracted and is used as a utility for another installation, is capable of supplying both power and high pressure air and performs an important role as the power/compressed air feed source of a plant. However, in a case where the amount of extraction air for another installation is relatively large and where the amount of extraction fluctuates conspicuously, a problem arises when the amount of combustor air to be supplied to the combustor of the gas turbine engine fluctuates widely, so that the normal continuous operation of the gas turbine engine is difficult.

As a countermeasure, it has been proposed to set upper and lower limit values for the flow rates of extraction and stopping operation of the gas turbine system when the amount of extraction falls outside the set limits. Alternatively, a bypass for connecting the discharge portion of the compressor to the exhaust the operation of the gas turbine is stopped. Alternatively, a bypass for connecting the discharge portion of the compressor to the exhaust portion of the gas turbine engine is provided, and an air release valve is interposed in the bypass, whereupon, when the flow rate of extraction falls short of the lower limit value, the air release valve is opened to release the air. A prior-art example concerning air release regulation is described in, for example, Japanese Patent Application Laid-open No. 259729/1985.

In the gas turbine engine of the extracting operation type, for the purpose of keeping a high efficiency the gas turbine engine, it is often the case that the designed flow rate of extraction is set at the beginning and that the specifications of the compressor and the turbine are determined on the premise of the flow rate of extraction.

In such a gas turbine engine, the continuation of the normal operation of the gas turbine engine becomes difficult in a case where the actual flow rate of extraction develops a great deviation relative to the designed value transiently or steadily.

It is presumed that the gas turbine is being operated at the designed flow rate of extraction under a certain load.

If, for any reason, the flow rate of extraction lowers drastically, the flow rate of the combustor air will increase and the discharge pressure of the compressor will rise without the air release valve. and, where the discharge pressure exceeds the upper limit of the allowable value thereof, surging might arise thereby leading to a serious accidental breakdown of the system.

On the other hand, if the flow rate of extraction increases drastically, the flow rate of the combustor air will decrease and, where the flow rate falls short of the lower limit of the allowable value thereof, the combustor and turbine portions might be damaged due to an excessive combustion temperature. Even the provision of the air release control channel which includes an air release regulating valve interposed in the path branched from a discharge portion of the compressor, cannot form a basic solution since, when the flow rate of extraction is too large, the role of protection cannot be performed, and, when the air is released with too small a flow rate of extraction, the gas turbine efficiency lowers drastically.

SUMMARY OF THE INVENTION

An object of the present invention is to eliminate the problems of the prior-art and to provide a control system which does not drastically adversely affect the efficiency of the gas turbine engine.

The above object can be accomplished by an expedient in which, regardless of fluctuations in the flow rate of extraction, the value of the flow rate of air for combustion is maintained at a certain set value or within a certain set range without releasing air.

According to the present invention, an inlet guide vane or any other means for regulating the flow rate of inlet air is disposed at the inlet of a gas turbine compressor, and the flow rate of the compressor inlet air is controlled in correspondence with the fluctuations in the flow rate of extraction.

In other words, the inlet air flow rate-regulating means is adjusted so that the amount of combustor air to be supplied to a combustor may become a predetermined desired value.

DETAILED DESCRIPTION

In accordance with the present invention, the difference between the flow rate of inlet air and the flow rate of extraction is continuously calculated and compared with the set flow rate or set flow rate range of combustion air determined from the construction conditions of a gas turbine engine proper, to find a deviation, according to which a correcting operation signal is sent to an inlet guide vane so as to control the degree of opening thereof, thereby making it possible to hold the flow rate of combustion air at the set value or within the set width regardless of the fluctuations of the flow rate of extraction from the designed value thereof, and to continue an operation without bringing a gas turbine installation into the abnormal states of compressor surging, an excessive combustion temperature, etc.

It is also possible in accordance with the present invention other than the control system based on the air flow rates, to adopt a method in which the discharge pressure of a compressor is measured so as to control the inlet guide vane in accordance with deviation of the measured pressure from a set pressure or a set pressure range, and by which equal effects are attained.

Figure 1:
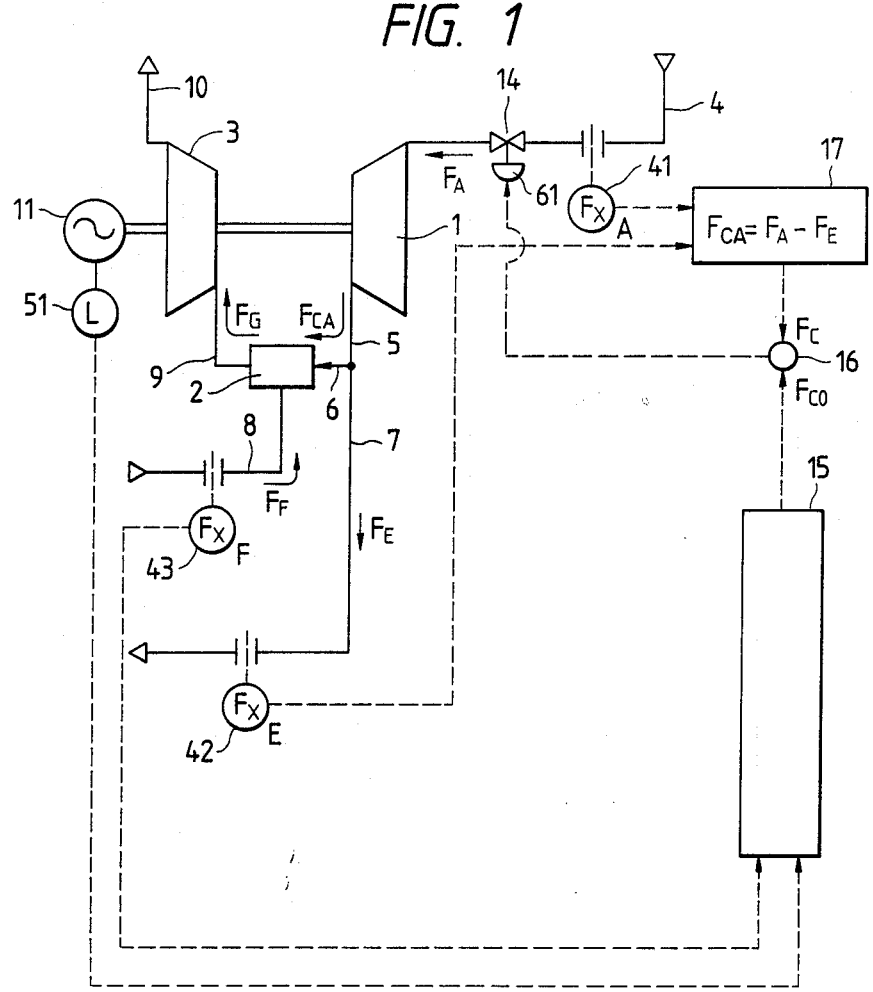
FIG. 1 is a schematic view of an embodiment of the present invention.

Referring to FIG. 1, the inlet air path 4 of a compressor 1, provided with an exhaust duct 10, is furnished with a detector 41 for the flow rate of inlet air and means 14 for regulating the inlet air flow rate. A conventional inlet guide vane is applied as the regulating means 14, and the flow rate of air to be taken into the compressor 1 is regulated by changing the degree of opening of the guide vane 14. Part of the discharge air of the compressor 1 is sent through a path 6 to a combustor 2, in which fuel fed through a fuel passage 8 is combusted. A combustion gas is sent through a combustion gas passage 9 to a gas turbine 3, in which power is generated. A load such as a dynamo 11 is connected to the gas turbine 3, and the compressor 1 is directly coupled thereto.

An extraction channel 7 is formed as a branch from the discharge path 6 of the compressor 1, and the extraction channel 7 supplies compressed air to another installation. The extraction channel 7 is furnished with a detector 42 for the flow rate of extraction air, and the signal of the detector 42 is applied to an arithmetic unit 17. The dynamo 11 is furnished with a load detector 51, with the load signal being applied to a unit 15 for setting the flow rate of combustor air, so as to produce the desired flow rate of air $F_{CO}$ corresponding to the load of the gas turbine 3. The arithmetic unit 17 receives the flow rate of inlet air $F_A$ as a detection signal from the detector 41, and the actual flow rate of combustor air $F_{CA}$ fed to the combustor 2 is calculated from the flow rate extraction air $F_E$ and the flow rate $F_A$.

A comparator 16 compares the flow rates $F_{CA}$ and $F_{CO}$ and produces a signal corresponding to the deviation thereof, according to which the degree of opening of the guide vane 14 is adjusted by an actuator 61.

In a steady state, the flow rate of combustor air $F_{CA}$ agrees with the desired flow rate of air $F_{CO}$ determined by the load, so that the gas turbine 3 maintains a stable operation.

When the flow rate of air required by the other installation changes to decrease the flow rate of extraction air $F_E$, the output signal $F_{CA}$ of the arithmetic unit 17 becomes greater than the desired value $F_{CO}$. Therefore, the comparator 16 produces an output signal corresponding to the deviation, with which the actuator 61 narrows the opening of the guide vane 14. Accordingly, the flow rate of inlet air $F_A$ is decreased until $F_{CA} = F_{CO}$ is established.

When the flow rate of extraction air $F_E$ increases, the output $F_{CA}$ of the arithmetic unit 17 becomes less than the desired value $F_{CO}$. Accordingly, the opening of the guide vane 14 is adjusted to increase the flow rate of inlet air $F_A$ unitl $F_{CA} = F_{CO}$ is established.

Thus, since the flow rate of inlet air $F_A$ is changed with the fluctuations of the flow rate of extraction air $F_E$, the combustor 2 is fed with the flow rate of combustion air as desired, and the gas turbine can be stably operated. In addition, since the flow rate of air is controlled on the inlet side of the compressor 1, the loss of the entire installation becomes less than in the prior-art air release system. Moreover, even when the flow rate of intake air of the compressor 1 is decreased, the operation of the gas turbine does not rush into a surging region although when the flow rate of air is decreased on the outlet side of the compressor 1, generally, surging is liable to occur.

In the embodiment of FIG. 1, the setting unit 15 is given the desired flow rate of air $F_{CO}$ as the function of the turbine load. However, it is also possible that, when the actual flow rate lies within a certain band in which allowable values for the stable operation of the gas turbine are added to the desired value, the guide vane 14 is held at the current degree of opening left intact, and that, only when the actual flow rate departs from the width of the band, a deviation signal is generated from the comparator 16.

Additionally, the load signal which is applied to the setting unit 15 can be replaced with the detection signal of a fuel flow rate detector 43 which is inserted in the fuel passage 8 as shown in FIG. 1.

According to the present invention, the arithmetic unit 17 may deliver the actual flow rate of combustor air. Therefore, instead of the detectors 41, 42 and the arithmetic unit 17, an air flow rate detector 41 may be inserted in the path 6, and the signal of this detector 41 and the desired flow rate of air $F_{CO}$ are compared so as to operate the actuator 61 with the resulting deviation.

Where the stability of the operation is good in spite of the fluctuations of the flow rate of combustor air of the gas turbine 3, the desired flow rate of air $F_{CO}$ may well be given as a fixed value regardless of the load of the gas turbine 3 so as to maintain $F_{CA} = F_{CO}$. With this arrangement, the load detectors 51 and 43 may be omitted so as to deliver the constant value from the setting unit 15.

Figure 2:
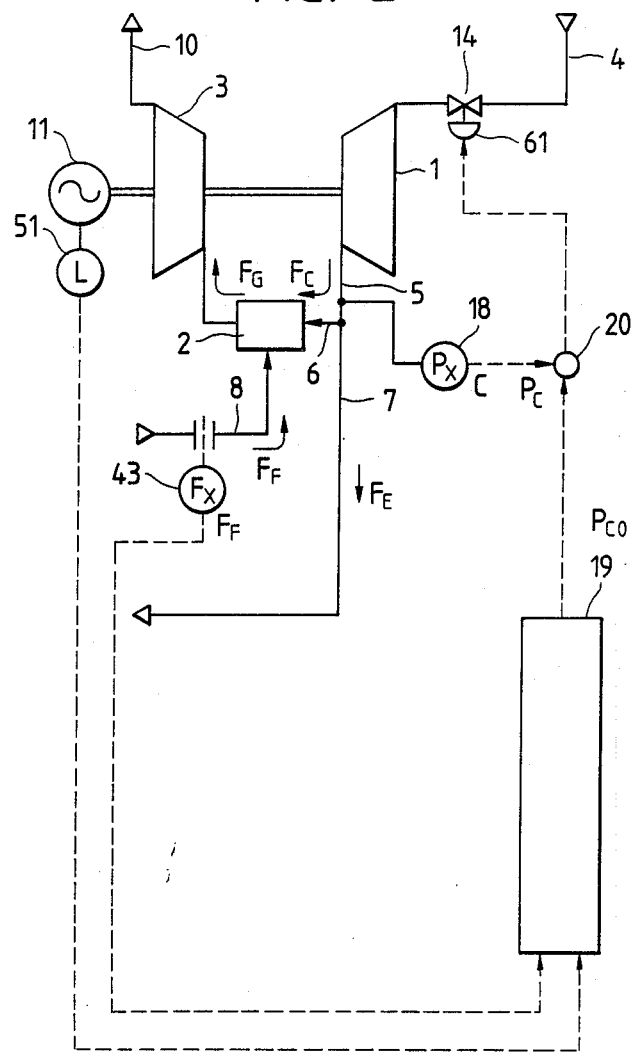
FIGS. 2 and 3 are schematic views respectively illustrating alternate embodiments of the present invention.

FIG. 2 shows another embodiment of the present invention, which differs from the embodiment of FIG. I in controlling the guide vane 14 so that the pressure of a path 5 on the inlet side of the combustor 2 may become a desired pressure value $P_{CO}$ set according to the load of the gas turbine engine. More particularly, a pressure setting unit 19 is fed with the signal of the detector 51 or 43, and delivers the desired pressure value $P_{CO}$ corresponding to the load. The pressure of the path 5 is detected by a pressure detector 18, the detected value $P_C$ and the desired value $P_{CO}$ are compared by a comparator 20, and the degree of opening of the guide vane 14 is adjusted through the actuator 61 in the direction in which the value $P_C$ comes into agreement with the value $P_{CO}$.

The discharge air of the compressor 1 is branched on the discharge side thereof into the path 6 and the extraction channel 7. If the pressure of the branch portion is of a predetermined value, air at a predetermined flow rate will enter the combustor 2. When the flow rate of extraction air $F_E$ of the extraction channel 7 increases, the discharge pressure of the compressor 1 is lowered. Therefore, $P_C < P_{CO}$ holds, the opening of the guide vane 14 is increased on the basis of the output of the comparator 20, and the flow rate of intake air of the compressor 1 increases. Consequently, the flow rate of combustor air $F_C$ is raised and is stabilized at $P_C = P_{CO}$.

The rate of air inflow into the combustor 2 changes with the fluctuations of the pressure $P_C$. Since, however, the first-order lag of the control channel extending from the detector 18 to the actuator 61 is much smaller than the change of the air flow rate of the extraction channel 7, the fluctuations of the flow rate of extraction air can be, in effect, compensated without incurring sharp fluctuations in the flow rate of combustor air.

The output of the setting unit 19 may be either a fixed value corresponding to the load signal or an allowable band width.

The embodiment of FIG. 2 has the advantage that the number of detectors can be reduced because the two detectors of the pressure detector 18 and the load detector 51 or 43 are sufficient.

The gas turbine engine can be stably operated against fluctuations in the flow rate of extraction air of the extraction channel, and the loss of the entire installation can be reduced.

Figure 3:
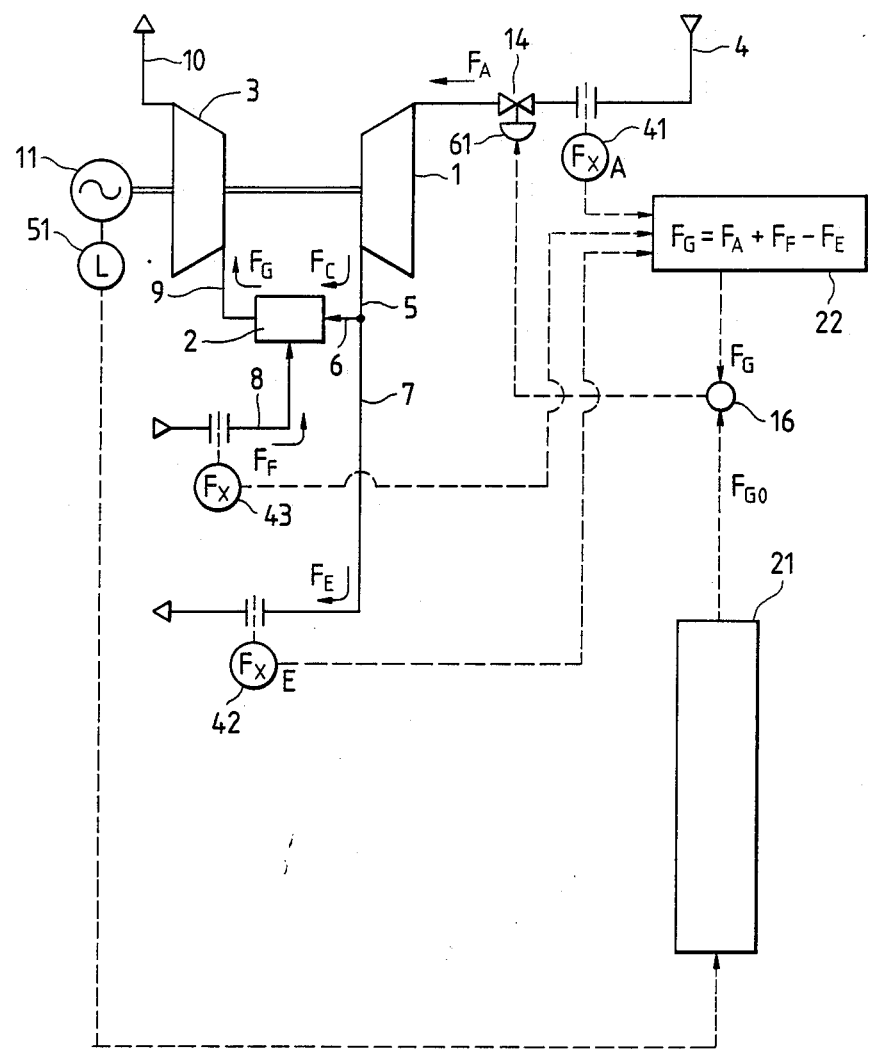

In the embodiment of FIG. 3, a gas of low calorific value is used as the fuel of a gas turbine engine and, when fluctuations in a heating magnitude are relatively great and the fluctuating components of a fuel flow rate are not negligible as a whole, the influential components of the fluctuating components are taken into consideration.

More specifically, with regard to the gas turbine engine whose heating magnitude fluctuates and which uses the gas of low calorific value, in order to stably operate the gas turbine, the flow rate of a combustion gas $F_G$ needs to be controlled so as to come into agreement with the desired flow rate of the gas $F_{GO}$ which corresponds to a load.

Since the flow rate of the combustion gas $F_G$ is given as the sum between the flow rate of the fuel gas $F_F$ and the flow rate of combustor air $F_C$, an arithmetic unit 22 is fed with the signals of the detectors 41, 42 and 43 with the arithmetic unit 22 providing an output of the flow rate $F_G$ as a result of a calculation of the following relationship:

$$F_G = F_A + F_F - F_E.$$

On the other hand, a setting unit 21 delivers the desired flow rate of the combustion gas $F_{GO}$ in correspondence with the signal from the load detector 51. The comparator 16 compares the flow rates $F_{GO}$ and $F_G$ so as to adjust the guide vane 14 in accordance with the resulting deviation.

In the embodiment of FIG. 3, where the flow rate of extraction air $F_E$ has changed, the guide vane 14 is adjusted so that the flow rate of inlet air $F_A$ may change so as to compensate the change of the flow rate $F_E$.

Where the heating value of the fuel gas of the gas turbine engine has changed, the flow rate of the fuel gas $F_F$ changes in order to hold the output of the gas turbine engine constant, but the flow rate $F_A$ changes so as to compensate the change of the flow rate $F_F$.

As in the embodiment of FIG. 1, the embodiment of FIG. 3, provides a gas turbine engine that can be stably operated against the fluctuations of the flow rate of extraction air.

When, in the embodiment of FIG. 3, a detector for detecting the flow rate of the combustion gas is inserted in the exhaust duct 10, the signal $F_G$ of the combustion gas flow rate detector and the desired flow rate $F_{GO}$ may well be compared by the comparator 16 so as to drive the actuator 61 in accordance with the resulting deviation.

As described above, according to the present invention, a gas turbine engine having an extraction channel 7 can be stably operated with an entire gas turbine installation loss reduced and in spite of fluctuations in the flow rate of extraction air.

What is claimed is:

1. In a gas turbine engine of an extracting operation type wherein a part of discharge air from a compressor is extracted and released to another installation, while a remaining part of the discharge air is supplied to a gas turbine combustor as air for combustion, a method of controlling the gas turbine engine comprising the steps of detecting a load driven by said gas turbine engine, and controlling a flow rate of inlet air of said compressor by adjusting said flow rate of inlet air in dependence upon a flow rate of extraction air and a desired flow rate of combustion air evaluated from a detected load value.

2. A method of controlling a gas turbine as defined in claim 1, wherein said compressor includes an inlet guide vane, and said flow rate of inlet air of said compressor is controlled by adjusting a degree of opening of said inlet guide vane.

* * * * *